United States Patent
Batzdorff et al.

(10) Patent No.: US 11,036,618 B2
(45) Date of Patent: Jun. 15, 2021

(54) TENANT CODE MANAGEMENT IN MULTI-TENANT SYSTEMS

(71) Applicant: Veeva Systems Inc., Pleasanton, CA (US)

(72) Inventors: Eric Batzdorff, Alameda, CA (US); Arvind Talari, Dublin, CA (US); ChandraShekhar Jammi, San Francisco, CA (US); Nathan Joseph Janken, Dublin, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 15/885,719

(22) Filed: Jan. 31, 2018

(65) Prior Publication Data

US 2019/0235992 A1     Aug. 1, 2019

(51) Int. Cl.
*G06F 9/44*      (2018.01)
*G06F 11/36*     (2006.01)

(52) U.S. Cl.
CPC ...... *G06F 11/3644* (2013.01); *G06F 11/3612* (2013.01)

(58) Field of Classification Search
CPC ....... G06F 11/34–3696; G06F 11/3644; G06F 11/3612
See application file for complete search history.

(56) References Cited

U.S. PATENT DOCUMENTS

| | | | |
|---|---|---|---|
| 8,495,427 B2 * | 7/2013 | Arnold | G06F 11/366 714/35 |
| 9,436,588 B2 * | 9/2016 | Koren | G06F 11/3466 |
| 9,483,391 B2 * | 11/2016 | Koren | G06F 11/3466 |
| 9,619,773 B2 * | 4/2017 | Himmelreich | G06Q 10/06375 |
| 9,692,640 B1 * | 6/2017 | Veladanda | H04L 41/0803 |
| 9,767,007 B2 * | 9/2017 | Koren | G06F 11/3466 |
| 2011/0087927 A1 * | 4/2011 | Arnold | G06F 11/366 714/38.1 |
| 2014/0096114 A1 * | 4/2014 | Koren | G06F 11/3466 717/128 |
| 2016/0078388 A1 * | 3/2016 | Himmelreich | G06Q 10/06375 709/224 |
| 2017/0039127 A1 * | 2/2017 | Koren | G06F 11/3466 |

\* cited by examiner

*Primary Examiner* — Wissam Rashid

(57) ABSTRACT

Systems and methods for managing tenant code for a multi-tenant system. Instrumentation code may be added to the tenant code and track its performance. The tenant code may be disabled when it is determined based on information from the instrumentation code that the tenant code is misbehaving. An approximate clock may be used to determine if the running time of the tenant code exceeds a threshold.

13 Claims, 4 Drawing Sheets

TENANT CODE MANAGEMENT IN MULTI-TENANT SYSTEMS

BACKGROUND

The subject technology relates generally to code management, and more particularly to tenant code management in multi-tenant systems.

In a multi-tenant system, a number of tenants share the hardware and software of the system, and a tenant may upload its code (e.g., application code) to the system so that a system server can execute it. Misbehaving tenant code program may consume too much system resource and affect performance of the system. It is desirable to provide a method which may detect and disable misbehaving tenant code program.

SUMMARY

The disclosed subject matter relates to a method for managing tenant code for a content management system. The method comprises: receiving a first piece of tenant code; and generating instrumented tenant code by adding instrumentation code to the first piece of tenant code, wherein the instrumentation code sends method calls to a service protection controller to enable the service protection controller to track performance of the first piece of tenant code when it is running, and responds to instructions from the service protection controller. The method further comprises: storing the instrumented tenant code in the multi-tenant system; receiving a first method call from the instrumented tenant code; determining a time of the first method call; determining that the tenant code program is misbehaving based on the time of the first method call; and sending a first response to disable the first piece of tenant code. To determine the bad behavior, the present invention instruments service-protection-checks into the tenant code prior to its execution, and the service-protect-checks keep track of metrics about the currently-executing code during execution of the tenant code. If a particular metric exceeds a particular threshold, then the service-protection check aborts the currently-running code.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
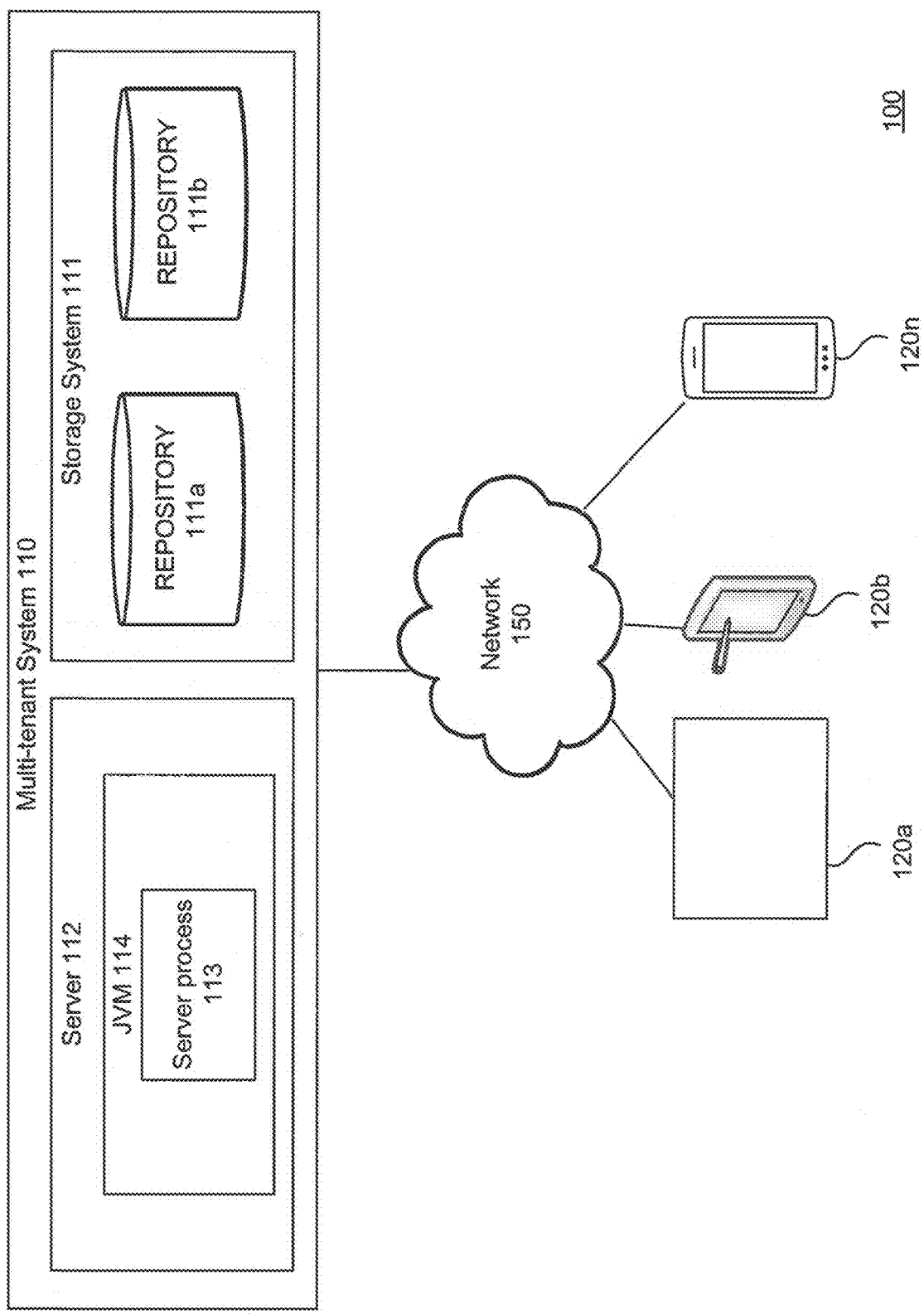
FIG. 1 illustrates an example high level block diagram of a multi-tenant architecture wherein the present invention may be implemented.

FIG. 1 illustrates an example high level block diagram of a multi-tenant architecture 100 wherein the present invention may be implemented. As shown, the architecture 100 may include a multi-tenant system 110, and a plurality of user computing devices 120a, 120b, . . . 120n, coupled to each other via a network 150. The multi-tenant system 110 may include a storage system 111 and a server 112. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the multi-tenant system 110 via the network 150, and may be any commercially available computing devices including laptop computers, desktop computers, mobile phones, smart phones, tablet computers, netbooks, and personal digital assistants (PDAs). A client application may run from a user computing device, e.g., 120a, and access the system 110 via the network 150.

The server 112 is typically a remote computer system accessible over a remote or local network, such as the network 150. The server 112 could be any commercially available computing devices. A server process 113 may be active on the server 112. Although FIG. 1 shows only one server, it should be understood that the system 110 may have multiple servers.

In one example, the server 112 may have a Java virtual machine ("JVM") 114 which may route a request from a user computing device to a repository (e.g., 111a or 111b) that the user is authorized to access.

The storage system 111 may store data in one or more repositories (e.g., 111a and 111b) that user computing devices may access. Code from different tenants may be executed in a common space in the server 112, but each tenant's data is segregated from other tenants' data in the storage system 111 by hardware or software. The storage system 111 may be any commercially available storage devices. In one example, the multi-tenant system 110 is a content management system, and the repositories may store content (e.g., documents in various formats) for tenants.

In a multi-tenant system, various elements of hardware and software may be shared by two or more tenants. For instance, the server 112 may simultaneously process requests from a plurality of tenants, and the storage system 111 may store data for a plurality of tenants. Each tenant may be assigned a repository (e.g., 111a), which is separated and secured from other tenants' data, by hardware or software. In a multi-tenant system, a user is typically associated with a particular tenant and is authorized by the tenant to access its repository. In one example, a user could be an employee of a pharmaceutical company which is a tenant, or customer, of the system 110. Each tenant has an exclusive share of the software and hardware of the system 110.

In one embodiment, the multi-tenant system 110 may run on a cloud computing platform. Users can access data on the cloud independently by using a virtual machine image, or purchasing access to a service maintained by a cloud database provider.

In one embodiment, the multi-tenant system 110 may be provided as Software as a Service ("SaaS") to allow users to access the system 110 with a thin client or a browser.

A tenant may register tenant code in its repository to run a particular event in the lifecycle of a record in the repository. The tenant code may be called triggers. In one implementation, a first tenant may register tenant code in its repository (e.g., 111a) which could run when a new record is created. For example, the tenant code may be registered to create a product audit record when a product is inserted. The tenant code may be loaded up from a content repository to the content management server 112 and executed.

Figure 2:
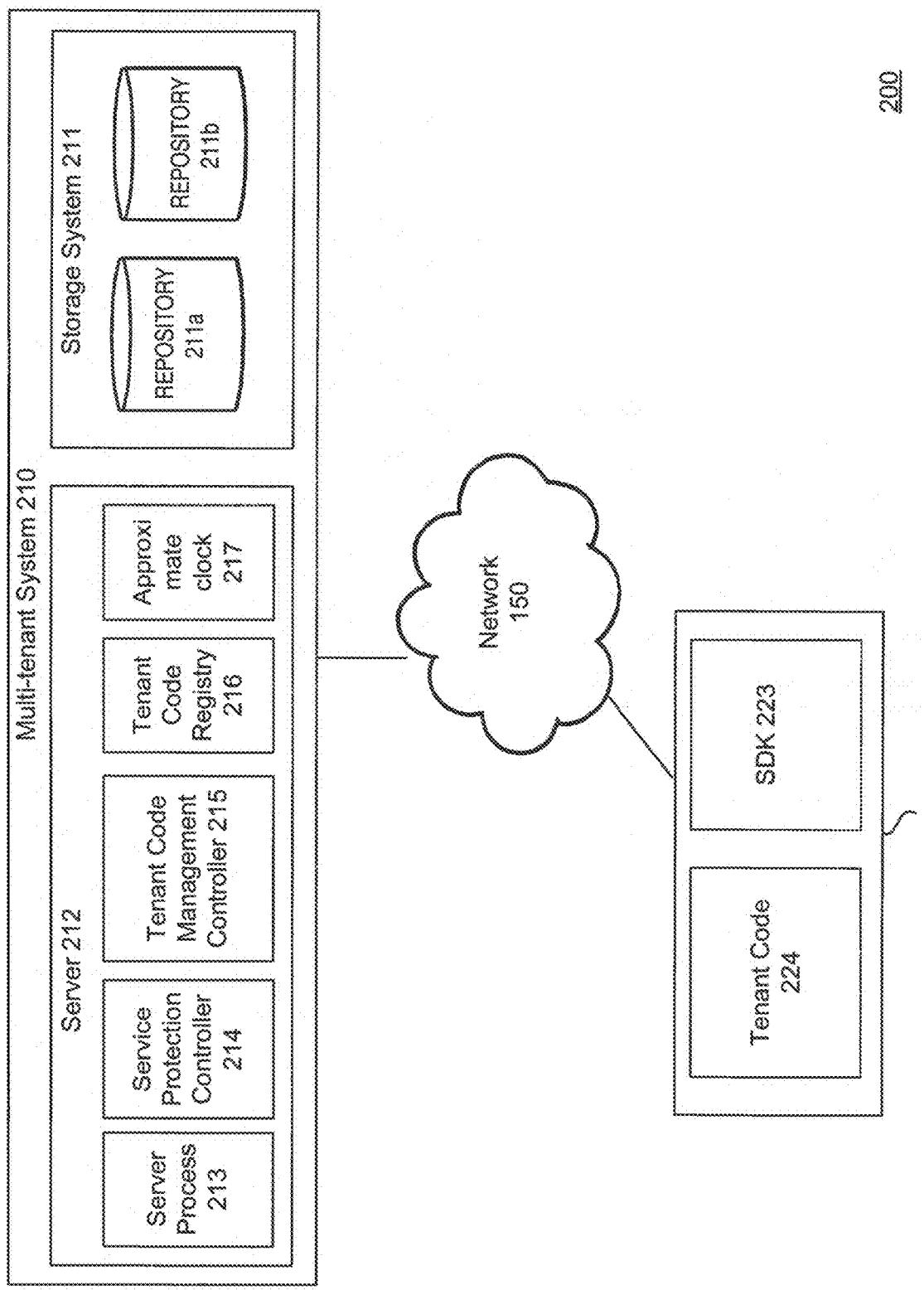
FIG. 2 illustrates an example high level block diagram of a tenant code managing architecture according to one embodiment of the present invention.

FIG. 2 illustrates an example high level block diagram of a tenant code management architecture according to one embodiment of the present invention. The architecture may be used to detect and disable misbehaving tenant code. Tenant code is domain-specific code which is uploaded to a repository (e.g., 211a) by a user so that it can be executed by a server 212, and invoked by a system 210 when a particular event occurs in the lifecycle of a record therein. For example, the tenant code might be a record after-insert trigger on a Product object. In this case, when a Product is created in the system 210, it will invoke any after-insert triggers prior to committing that new Product data in a persistent storage. An event is a point in a record's lifecycle (e.g. after-insert). A trigger is domain-specific code invoked at an event in a record's lifecycle, e.g., the above after-insert trigger. A record is a "single, implicitly structured data item" in the system 210.

The server 212 may have a server process 213, a service protection controller 214, a tenant code management controller 215, a tenant code registry 216, and an approximate clock 217.

The service protection controller 214 may track state of the tenant code, and make a decision on whether the tenant code program is misbehaving. When instrumented tenant code is running, it may make calls to the server 212, in particular the service protection controller 214. From the calls, the service protection controller 214 may make a runtime determination if the tenant code program is misbehaving by looking at, e.g., how long the tenant code has been running, or how much memory it consumed. In one implementation, the service protection controller 214 may keep a track on how long the tenant code has been running each time it calls in. If the service protection controller 214 determines that the tenant code program is misbehaving, it may send out an exception to abort execution of the tenant code.

The tenant code management controller 215 may receive the tenant code from user via a user computing device, rewrite the tenant code to inject method calls to the server 212, so that the instrumented code can run the loop of the tenant code, make method calls the server 212, and respond to instructions from the server 212 to abort execution of the tenant code if the tenant code program is misbehaving. In one implementation, the tenant code management controller 215 may parse instructions of the tenant code, and add the instrumentation code, or method calls, between instructions of the tenant code to form the instrumented code.

The approximate clock 217 may run separately from the clock of the multi-tenant system 210, may be less precise than the system clock, and may be used to check the tenant code running time. The approximate clock may be precise to, e.g., half a second, a quarter of a second, or a tenth of a second. Every time the instrumented code calls in, the approximate clock 210 may be checked for the time. The approximate clock may significantly improve performance of the overall system. Since the service-protection-checks run very frequently, the present invention uses the approximate clock 217 to bypass service-protection work in the case that a relatively small amount of time has passed since the prior service-protection check ran. This is a big performance benefit for the time-based service-protection thresholds.

As shown, a software development kit ("SDK") 223 may be downloaded to a user computing device 220a from the system 210 by the user for developing and managing tenant code. The SDK 223 may be a set of Java libraries including the tenant code API's and a few programs. The user may develop some tenant code 224, and upload the tenant code 224 to the system 210.

Figure 3A:
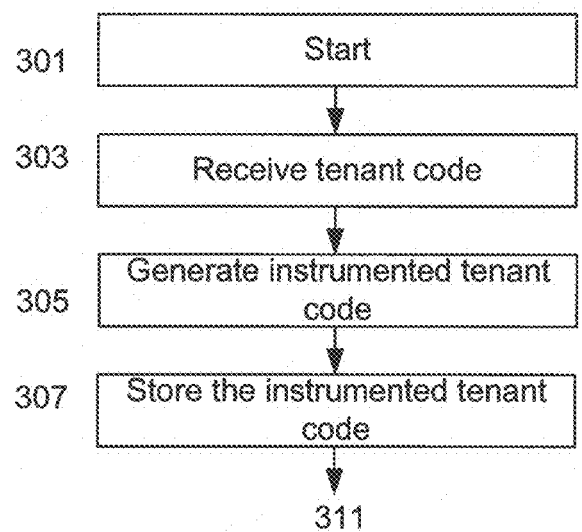
FIGS. 3A and 3B illustrate a flowchart of a method for managing tenant code in the multi-tenant architecture according to one embodiment of the present invention.
Figure 3B:
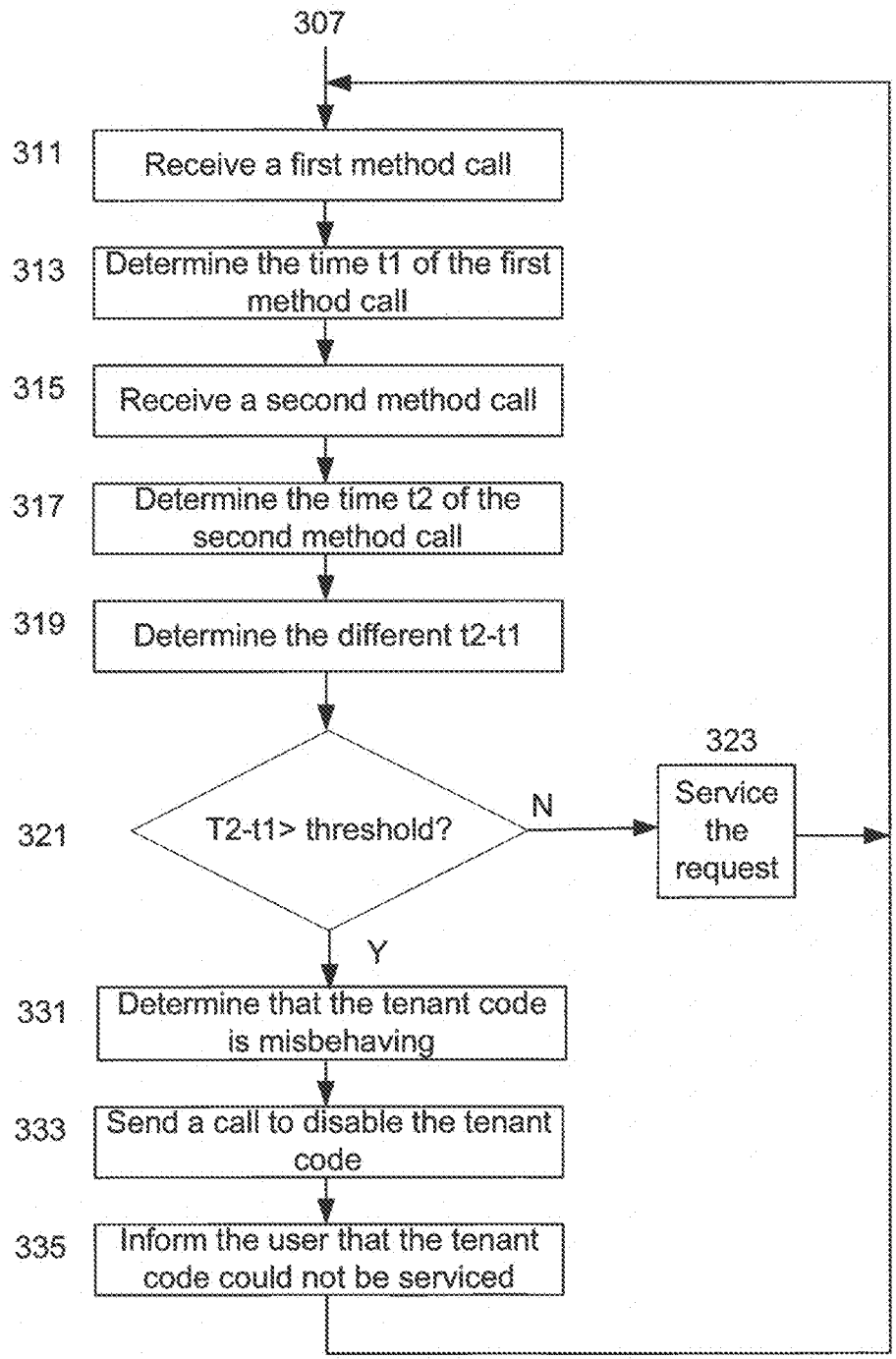

FIGS. 3A and 3B illustrate a flowchart of a method for managing tenant code in a multi-tenant system according to one embodiment of the present invention. The process may start at 301.

At 303, tenant code may be received at the server 212.

The tenant code may be instrumented to enable detection of misbehaving program. At 305, the tenant code may be compiled to generate instrumented tenant code, e.g., by the tenant code management controller 215. In one implementation, the tenant code management controller 215 may parse instructions of the tenant code, and add the instrumentation code, or method calls, to the service protection controller 214, between instructions of the tenant code to form the instrumented tenant code. The instrumentation code may track the performance of the tenant code when it is running to provide performance information. In one implementation, the performance information may be running time of the tenant code. At 307, instrumented tenant code may be stored in the storage system 211.

At 311, a first method call may be received at the service protection controller 214 from the instrumented tenant code.

At 313, the time of the first method call t1 may be checked, e.g., with the approximate clock 217.

At 315, a second method call may be received at the service protection controller 214 from the instrumented tenant code.

At 317, the time of the second method call t2 may be checked, e.g., with the approximate clock 217.

At 319, the difference between the times of the two method calls, t2−t1, may be determined by the service protection controller 214.

At 321, it may be determined if the difference between the times of the two method calls, t2−t1, exceeds a predetermined threshold (e.g., 2 seconds) by the service protection controller 214.

If the difference between the times of the two method calls, t2−t1, does not exceed a predetermined threshold, the request may be serviced at 323, and the process may return to 311 to continue the service protection check.

If the difference between the times of the two method calls, t2−t1, exceeds the predetermined threshold, the service protection controller 214 may determine that the tenant code program is misbehaving at 331.

In one implementation, the precision of the approximate clock may be based on the predetermined threshold. In one example, when the threshold is 2 seconds, the approximate clock may be precise to 2 seconds.

In one implementation, a background thread may be used to check the status of the tenant code. The background thread may check the approximate clock regularly, based on the threshold. In one example, the threshold is 2 seconds, and the background thread may check the approximate clock once every 2 seconds. The time from the approximate clock for the last check and the current time from the approximate clock may be compared. If they are the same, it may be determined that the running time of the tenant code does not exceed the threshold, and the tenant code program is not behaving. If the time from the approximate clock for the last check and the current time from the approximate clock are different, it may be determined that the tenant code is misbehaving.

At 333, a call to disable the tenant code may be sent to the instrumented tenant code as the response. In one implementation, the service protection controller 214 may send out a misbehaving exception to trap the request from the tenant code. The tenant code is only allowed to manage a list of approved exceptions, which do not include the misbehaving exception. As a result, the request from the tenant code would not be serviced.

At 335, a notice may be sent to the user by the server process 213 to inform him/her that the request could not be serviced because its running time is too long.

The process may then return to 311 to continue the service protection check.

On example of the instrumentation code is as follows:

```
/**
 * Checks whether untrusted code has exceeded the CPU time allowed,
 MAX_CPU_TIME_ALLOWED.
 * Calls to this method will have been instrumented into untrusted.
 * <p>
 *   If the limit has been exceeded, this throws a {@link
 CodeInterruptedException}.
 * </p>
 *
 * @param lastCheckTime the last time this method was invoked
 * @return the time this method is invoked. If this method is invoked
 *     again, it should be provided back to this method
 * @throws CodeInterruptedException when CPU time has exceeded
 the maximum allowed
 */
public static long check(long lastCheckTime) throws
CodeInterruptedException {
    long currentTime = TIME_KEEPER.currentNanoTime( );
    if (currentTime != lastCheckTime) {
        long currentThreadCpuTime =
        threadMXBean.getCurrentThreadCpuTime( );
        CodeMonitor monitor = CodeMonitorAccessor.getCurrent( );
        if ((currentThreadCpuTime - monitor.getStartCpuTime( )) >
MAX_CPU_TIME_ALLOWED){
            throw new CodeInterruptedException("TIme exceeded");
        }
    }
    return currentTime;
}
```

As shown, the instrumentation code may help to check whether the tenant code has exceeded the CPU time allowed. If yes, an exception may be sent to the service protection controller 214 to abort execution of the tenant code The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for managing tenant code for a multi-tenant system, comprising:
    receiving a first piece of tenant code;
    generating instrumented tenant code by adding instrumentation code to the first piece of tenant code, wherein the instrumentation code in the instrumented tenant code sends method calls to a service protection controller to enable the service protection controller to track performance of the first piece of tenant code when it is running, and responds to instructions from the service protection controller, wherein the service protection controller further determines if the tenant code is misbehaving, and wherein the tenant code program is misbehaving when it consumes more memory than it should;
    storing the instrumented tenant code in the multi-tenant system;
    receiving a first method call from the instrumentation code in the instrumented tenant code in the multi-tenant system;
    determining a time of the first method call from the instrumentation code in the instrumented tenant code;
    determining that the tenant code program is misbehaving based on the time of the first method call from the instrumentation code in the instrumented tenant code; and
    sending a first response to disable the first piece of tenant code,
    wherein the first method call is generated by the instrumentation code without responding to a user input.

2. The method of claim 1, further comprising: parsing instructions of the first piece of tenant code, and adding the instrumentation code between instructions of the first piece of tenant code to form the instrumented tenant code.

3. The method of claim 1, wherein the performance information comprises running time of the first piece of tenant code.

4. The method of claim 1, further comprising: receiving a second method call from the instrumented tenant code, and determining the time of the second method call.

5. The method of claim 4, further comprising: determining a difference between the time of the second method call and the time of the first method call.

6. The method of claim 5, further comprising: determining that the difference between the time of the second method call and the time of the first method call exceeds a predetermined threshold.

7. The method of claim 6, further comprising: determining that the tenant code program is misbehaving.

8. The method of claim 4, wherein an approximate clock is used to check the time of the first method call and the time of the second method call, and wherein the approximate clock is less precise than a clock of the multi-tenant system.

9. The method of claim 8, wherein precision of the approximate clock is based on a predetermined threshold.

10. The method of claim 8, wherein the approximate clock is precise to the predetermined threshold.

11. The method of claim 10, further comprising: determining that the first piece of tenant code is misbehaving when the time of the second method call from the approximate clock is different from the time of the first method call from the approximate clock.

12. The method of claim 4, wherein the first response is a misbehaving exception for trapping the second method call.

13. The method of claim 1, further comprising: sending a notice to indicate that first piece of tenant code is disabled.

* * * * *